W. W. HAMER.
Mill Bolt.
No. 18,637.
Patented Nov. 17, 1857.
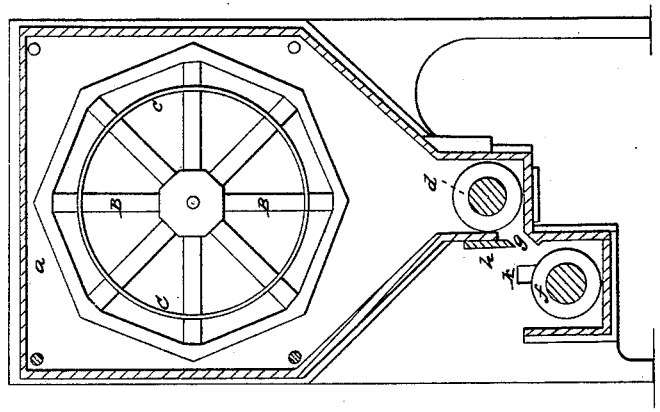
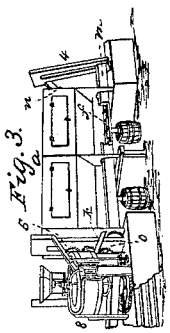
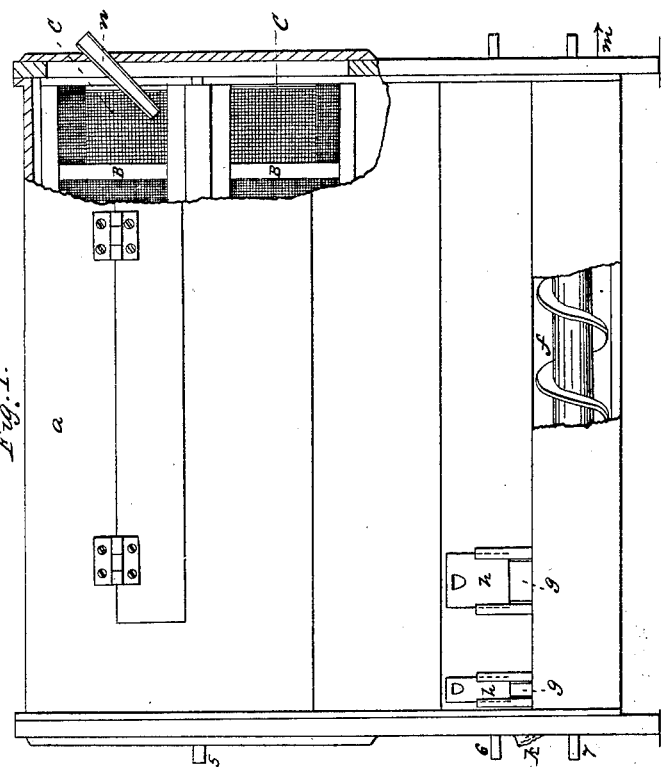

UNITED STATES PATENT OFFICE.

W. W. HAMER, OF CINCINNATI, OHIO.

FLOUR-DISTRIBUTING BOLT FOR GRINDING-MILLS.

Specification of Letters Patent No. 18,637, dated November 17, 1857.

*To all whom it may concern:*

Be it known that I, W. W. HAMER, of the city of Cincinnati, in the county of Hamilton and State of Ohio, have invented a new and useful Improvement in Bolting Apparatus for Portable Flour-Mills; and I do hereby declare that the following is a full, clear, and exact description thereof, reference being had to the accompanying drawings and to the letters and figures of reference marked thereon and made to form part of this specification.

Similar letters refer to like parts of the improvement.

The nature of my improvement consists in the precise combination and arrangement of the conveyers and their compartments joined with each other and the bolting chest for passing the middlings, shorts, &c., direct from what I denominate the flour conveyer into the ground grain conveyer for rebolting the middlings, shorts, &c., by being carried up with the ground grain and depositing again in the reel for rebolting.

To enable others skilled in the art to make and use my improvement I will proceed to describe its construction and operation by referring direct to the accompanying drawings of which—

Figure 1 is a side elevation of the bolting chest. Fig. 2 is a transverse sectional elevation showing the arrangement of the conveyers and their compartments, and Fig. 3 is a perspective view of the bolting apparatus and mill as connected together when in operation.

($a$) represents the bolting chest provided with a reel B, B, and conveyers $d$ and $f$, and the reel B, B, and conveyers $d$ and $f$ are put in motion with the gear wheels 5, 6 and 7, which wheels receive their motion from the mill spindle.

The operation of the mill bolting apparatus and improvement is as follows: The grain is ground in the mill and passes into the conveyer ($f$) through the spout ($k$) and is conveyed to the end of the conveying compartment and passes out at an opening at ($m$) and from thence it is elevated into the bolting reel through the elevating box (4) and spout ($n$) and the ground grain is made to fall on a wire gauze cylinder ($c\ c$) attached to the end of the bolting reel on the inside of the bolting cloth for the purpose of more evenly distributing the ground grain over the surface of the bolting cloth. The bolting process then commences and the flour with its different qualities middlings, shorts, &c., fall into the conveyer compartment ($d$) and is carried out of the bolting apparatus through suitable openings into barrels as represented in Fig. 3, at different points under the bolting chest. And when it is desired to rebolt the middlings, shorts, &c., in place of discharging them out at the bottom of the chest the conveyer ($d$) throws them back into the conveyer ($f$) placed below the conveyer ($d$) as represented in Fig. 2, through the openings ($g$) and they are then carried up into the bolting reel again through the elevating box (4) with the ground grain, as before stated, and when it is desired to discharge the middlings, shorts, &c., from the bolting apparatus without rebolting, the openings ($g$) are closed, and the middlings, shorts, &c., are discharged through suitable openings from the bottom of the chest the same as the fine flour.

I disclaim the use of the conveyers for mere conveying purposes, as they have often been used for such before. But What I do claim as my improvement and desire to secure by Letters Patent is—

The exact combined arrangement of the conveyers ($d$) and ($f$) and their compartments when united together, with the openings ($g$) as represented in Fig. 2, and specified in the foregoing specification, for purposes before mentioned.

W. W. HAMER.

Witnesses:
M. BENSON,
CHARLES H. FOX.